J. R. LANGLEY.
GEAR SHIFTING MECHANISM.
APPLICATION FILED JUNE 29, 1914. RENEWED OCT. 30, 1919.

1,363,662.

Patented Dec. 28, 1920.
2 SHEETS—SHEET 1.

WITNESSES:

INVENTOR
Jesse R. Langley.
BY
ATTORNEY

J. R. LANGLEY.
GEAR SHIFTING MECHANISM.
APPLICATION FILED JUNE 29, 1914. RENEWED OCT. 30, 1919.
1,363,662.
Patented Dec. 28, 1920.
2 SHEETS—SHEET 2.
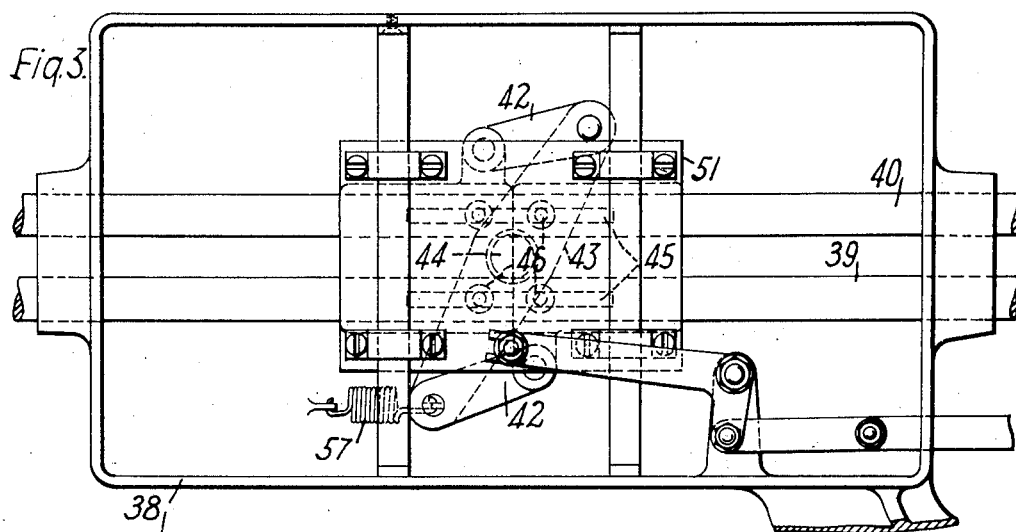
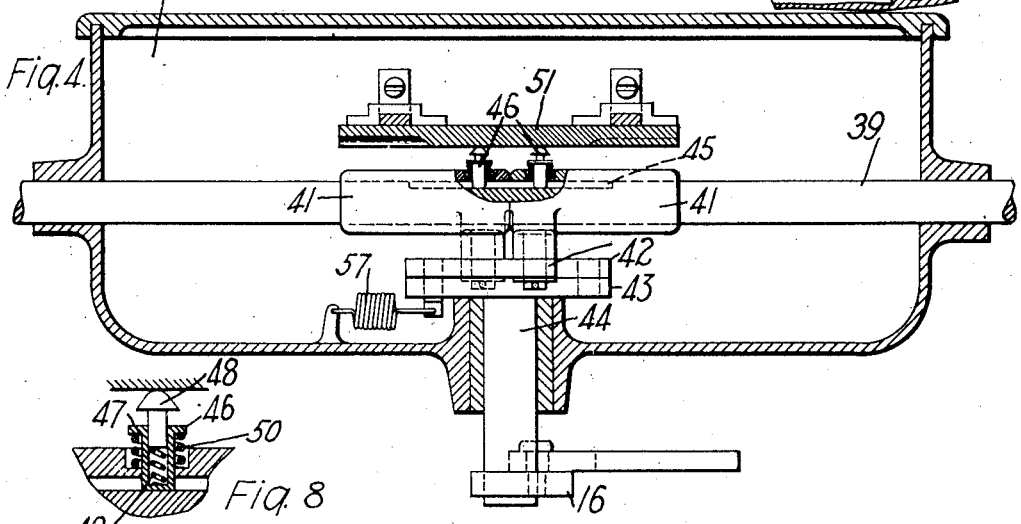
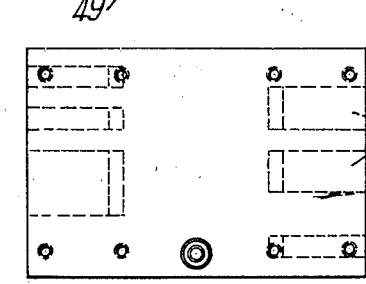
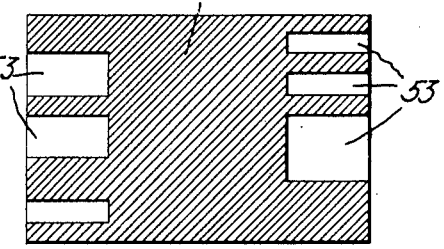
WITNESSES:
INVENTOR
Jesse R. Langley.
BY
ATTORNEY

UNITED STATES PATENT OFFICE.

JESSE R. LANGLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,363,662.   Specification of Letters Patent.   Patented Dec. 28, 1920.

Application filed June 29, 1914, Serial No. 847,795. Renewed October 30, 1919. Serial No. 394,632.

*To all whom it may concern:*

Be it known that I, JESSE R. LANGLEY, a citizen of the United States, and a resident of Wilkinsburg, in the county of Allegheny and State of Pennsylvania, have invented a new and useful Improvement in Gear-Shifting Mechanism, of which the following is a specification.

My invention relates to gear-shifting mechanisms and particularly to such mechanisms as are controlled by selective devices and are actuated by the usual clutch pedal to control the shiftable gear wheels of the transmission mechanisms of automobiles or other motor vehicles.

My invention has for one of its objects to provide a mechanism of the character indicated above that is simple in construction and efficient in operation to automatically return the shifted gear wheels to a neutral position before they can be adjusted for a different speed ratio.

A second object of my invention is to provide an arrangement which operates to positively prevent the shifting of any of the transmission gear wheels to an operative position when the selective mechanism is adjusted for the neutral position of the transmission mechanism.

In the operation of devices of the same general character as that of my invention, it is desirable that a means be provided for positively preventing the shifting of any of the transmission gear wheels when the selective mechanism is adjusted for the neutral position, because it may occur that the vibration of the vehicle or other cause may operate to effect such connection and cause serious damage to the transmission mechanism.

I provide a shifting mechanism in which the shiftable gear wheels are locked in the neutral position when the selective mechanism is adjusted for that position, and any gear wheel that may have been shifted, has been brought to such position.

Figure 1:
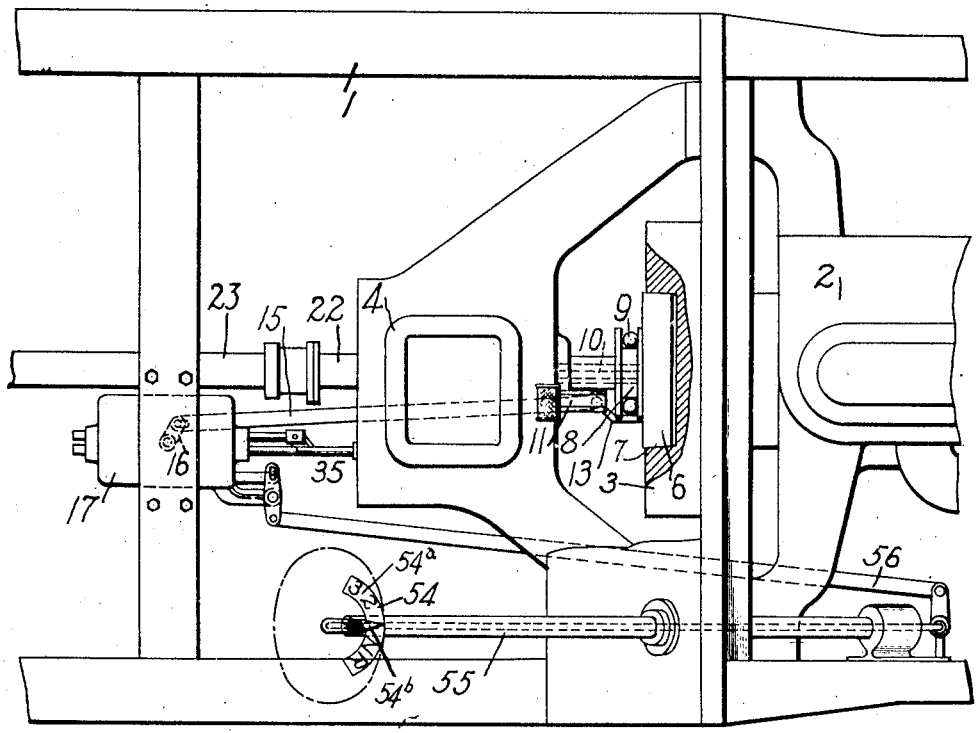
Figure 2:
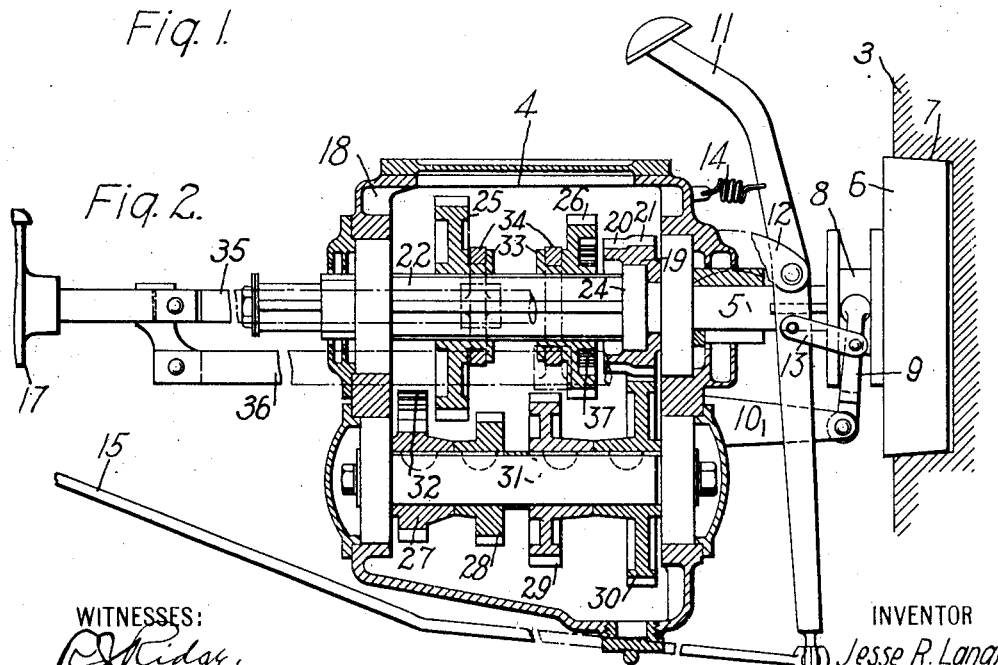

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a plan view of the gear-shifting mechanism. Fig. 4 is a view, in longitudinal section, of the mechanism of Fig. 3. Figs. 5 and 6 are plan views of a cam plate, as viewed from the top and bottom, respectively. Fig. 7 is an end view, in elevation, of the cam plate. Fig. 8 is an enlarged view, in section, of the details of an actuating pin.

Referring particularly to Figs. 1 and 2, an automobile chassis 1, only a portion of which is shown, is provided with a gas engine 2, having a fly wheel 3. The transmission mechanism or change-speed gear mechanism 4 is connected to the engine shaft by a shaft 5 and a conical clutch member 6, that is slidably mounted on the shaft 5 to coact with a correspondingly shaped clutch member 7 formed in the fly wheel 3. The clutch member 6 is provided with an integral grooved collar member 8 to be engaged by a yoke member 9 that has a pivotal support upon a bracket 10. A pedal lever 11, that is adapted to be operated by the foot of the operator, has a pivotal support upon a lug 12 and is connected by a link 13 to the yoke member 9. A spring 14, that is attached at one end to a suitable stationary part, normally retains the clutch pedal lever 11 in its rearward position, with the clutch member 6 engaging the clutch member 7 in the fly wheel 3. A link 15 connects the pedal lever 11 to a lever arm 16 of a gear-shifting mechanism 17, a lost motion connection being provided between the link 15 and the lever arm 16.

The transmission mechanism 4 forms no part of my invention, but is so combined therewith, that a description thereof is desirable in order to explain the operation of the gear-shifting mechanism. The shaft 5, which is connected to the clutch member 6, extends into the transmission casing 18 and has a bearing in an end wall of the same. A gear wheel 19, having two sets of gear teeth 20 and 21, is mounted upon the shaft 5 within the casing 18. The transmission shaft 22, which is connected to the main transmission shaft 23, is in axial alinement with the shaft 5 and has a bearing at 24 within the gear wheel 19. The shaft 22 is adapted to be connected to the shaft 5 at different speed ratios, by means of two gear wheels 25 and 26, that are slidably keyed upon the shaft 22, gear wheels 27, 28, 29 and 30, that are fixed upon the counter shaft 21 and an idler gear wheel 32, that is in mesh with the gear wheel 27.

The gear wheel 30 is always in mesh with the teeth 21 of the gear wheel 19 to connect the shafts 5 and 31. The mechanism is arranged to provide three speeds in the forward and one in the reverse direction. The changes in speed ratio are controlled by the slidable gear wheels 25 and 26, which are respectively provided with integral grooved collars 33 to be engaged by yoke members 34. The yoke members 34 are respectively fixed upon shift rods 35 and 36, that are controlled by the gear shifting mechanism, as will be later described.

When the gear wheel 25 is in mesh with the gear wheel 28, the mechanism is in its first or low-speed position, and the shaft 5 is connected through the gear teeth 21, gear wheel 30, counter shaft 31 and gear wheels 28 and 25, to the transmission shaft 22. For the second or intermediate speed, the gear wheel 26 is shifted into mesh with the gear wheel 29. For the third or high speed the gear wheel 26 is shifted to the right, until internal gear teeth 27, with which the gear wheel 26 is provided, mesh with the gear teeth 20. The shaft 5 is then directly connected to the transmission shaft 22, and the latter is driven at engine speed. For driving in the reverse direction, the gear wheel 25 is shifted into mesh with the idler gear wheel 32 which is always in mesh with the gear wheel 27. The transmission mechanism is illustrated in its neutral or inoperative position, in which the shaft 22 is not connected to the counter shaft 21.

Referring now to Figs. 3 to 8, inclusive, the gear-shifting mechanism comprises a housing or casing 38, of substantially rectangular shape. Two shift rods 39 and 40 are slidably mounted in the end walls of the casing 38 and are respectively connected to the shift rods 35 and 36 of the transmission mechanism. Two block members 41, which are slidably mounted on the shift rods 39 and 40, are connected by links 42 to a lever 43 that is carried by a rock shaft 44. The rock shaft 44, which extends through the casing 38, carries, at its lower end, the lever arm 16 which is connected to the pedal lever 11. An actuation of the pedal lever 11 beyond its clutch-disengaging position operates, through the connected mechanism just described, to actuate the blocks 41 in opposite directions, simultaneously. Each of the shift rods 39 and 40 is provided with a longitudinal groove 45. Each of the block members 41 is provided with two pins 46, which are adapted to extend into the grooves 45 to engage the respective shift rods 39 and 40. As shown in detail in Fig. 8, the pins 46 comprise an outer shell 47 and a headed rod 48, which is normally held in its extended position by a spring 49. A spring 50, which is weaker than the spring 49, tends to retain the pin 46 in its upper position out of engagement with its corresponding shift rod.

The positions of the several pins are controlled by a transversely movable cam plate 51 having an intermediate plane surface 52 which corresponds, in extent, to the movement of the blocks 41 during the shifting of a gear wheel from an operative position to the neutral position. The cam plate 51 is provided, at each end, with a number of recessed portions or grooves 53 which, when in register with the coacting pins, permit them to be disengaged from the corresponding shift rods 39 and 40. The grooves 53 are so arranged that, when the cam plate is adjusted for any desired speed ratio, all of the pins, except that one which will produce the desired speed ratio, are permitted to be actuated upwardly by the springs 50. The position of the cam plate is controlled by an indicating mechanism 54 that is mounted upon the usual steering column 55 of the vehicle and is connected to the plate 51 by a suitable linkage mechanism 56. The indicating mechanism 54 comprises a stationary segment 54ª bearing the characters 3, 2, 1, N and R which correspond to the various positions of the transmission mechanism. A pointer 54ᵇ, which is connected to the cam plate 51, registers with the letter or numeral which corresponds to the speed for which the gear shifting mechanism is adjusted.

It may be assumed that the transmission gear mechanism is in its neutral position, as illustrated in Fig. 2, and that the gear shifting mechanism is in its corresponding normal or neutral position, as shown in Figs. 3 and 4. It may be assumed, also, that the engine has been started and that the engine clutch members 6 and 7 are disengaged. It is desirable to start the vehicle on first speed, and the indicating mechanism 54 is accordingly adjusted to that position, as illustrated in Fig. 1. The cam plate 51 then occupies such position that one of the grooves 53 is in register with each of the pins 46, except that one which will actuate the shift rod 39 to the right, as illustrated. The clutch pedal lever 11, which, at the time of starting the engine, is in such a position that the engine clutch members 6 and 7 are out of engagement, is then pressed completely forwardly to actuate the link 15 which has a lost-motion connection to the lever arm 16 for permitting the usual manipulation of the clutch without actuating the gear-shifting mechanism.

The lever arm 16 accordingly operates through the rock shaft 44, lever 43 and links 42 to slide the blocks 41 in opposite directions simultaneously. When the pins 6 approach the ends of the grooves 45, all of the pins 46, except that one which operates to actuate the shift rod 39 to the right, are permitted, by the corresponding grooves 53, to be actuated upwardly by the springs 50 out of engagement with the corresponding shift rods. Further movement of the blocks causes the pin that is retained in its engaging position to engage the rod 39 and move it to the right to effect the meshing of the gear wheel 25 with the gear wheel 28.

The operator then permits the spring 14 to retract the pedal lever 11. A spring 57, that is attached, at one end, to a suitable stationary part and, at the other end, to the lever 43, operates to return the blocks 41 and the connected parts to their respective normal positions. The pins 46 are actuated downwardly, by the curved surfaces of the grooves 53, to again project into the grooves 45 of the shift rods. That pin 46 which operates to shift the rod 39 to the left, must be compressed during a portion of its travel because the rod 39 and the groove 45 have been shifted to the right beyond the ends of the grooves 53. This relative movement of the parts of the pin is provided for by the telescopic movement permitted by the spring 49. When the end of the groove 45 is reached, the spring 49 again expands the pin 46 to its normal length. The engine clutch is still disconnected when the various parts are in their respective normal positions. Further return movement of the clutch lever 11, that is permitted by the lost-motion connection with the lever arm 16, effects the engagement of the engine clutch, and the vehicle will be driven at first speed through the connections above described.

When it is desired to change the speed ratio, as, for example, to second speed, the indicating mechanism 54 is adjusted to the position indicated by 2. The cam plate 51 will be correspondingly adjusted to such a position that the shift rod 40 will be actuated to the left, as illustrated. To effect the change to the desired speed, the operator presses the pedal lever 11 to disengage the engine clutch. The rod 39 is in its shifted position and the left end of the groove 45 is near the coacting pin 46, so that a slight outward movement of the latter member will effect an engagement of these parts. Further actuation of the pedal lever 11, after the clutch is disengaged, accordingly operates to shift the rod 39 to its neutral position. At this point, all of the pins 46, except that one which shifts the rod 40, as above described, have been released, by the corresponding grooves 53, from engagement with the corresponding shift rods. Further movement of the clutch lever 11 causes the rod 40 to be shifted to the left, and the gear wheel 26 is shifted into mesh with the gear wheel 29. The return of the pedal lever 11 operates first to permit the various parts to assume their normal positions and then to effect the engagement of the engine clutch, whereupon the vehicle will be driven at second speed.

In the same manner, changes may be made to third speed or the direction of drive reversed, by adjusting the indicating mechanism to the appropriate positions. It will, of course, be understood that, in order to reverse the direction of the vehicle, it is necessary to bring it to a stop before the clutch is engaged. When it is desired to return either of the shiftable gear wheels 25 and 26 to the neutral position, the indicating mechanism is adjusted to the position designated by N. The cam plate then occupies such a position that no grooves 53 register with the several pins 46. The clutch is disengaged as before and the blocks 42 are shifted outwardly. The shifted rod is in a position to be engaged immediately by the appropriate pin 46 to return it to its neutral position. When the several pins reach the ends of the grooves 45, further movement is impossible, since all of the pins engage the corresponding rods and tend to shift each of the rods in opposite directions. The rods 39 and 40 are thus caused to be prevented from moving past the neutral position when the indicating mechanism has been adjusted to the corresponding position.

It will be noted that I provide a mechanism which is simple in construction and comprises very few parts. I have also provided a mechanism for positively preventing the shifting of the gear mechanism from its neutral position by inadvertence or accident. These and other advantages will be apparent to those skilled in the art to which my invention appertains.

I claim as my invention:

1. In a gear-shifting mechanism, the combination with a shiftable member, and a member movable relatively and rectilinearly thereto, of means carried by said movable member for connecting said members, and a cam plate transversely movable relatively to said shiftable member for controlling said connecting means.

2. In a gear-shifting mechanism, the combination with a shiftable member, and a pair of members simultaneously movable relatively and rectilinearly thereto in opposite directions, of means for connecting said members, and a transversely movable cam plate having recessed portions for controlling said connecting means.

3. In a gear-shifting mechanism, the combination with a shiftable member, and a pair of members movable relatively thereto, in opposite directions, of means for connecting said members, and a transversely movable cam plate having longitudinal grooves for controlling said connecting means.

4. In a gear-shifting mechanism, the combination with a pair of shiftable members, a pair of members simultaneously movable in opposite directions, and means for connecting said movable members to said shiftable members, of a single means for normally retaining said connecting means in operative positions and for selectively releasing a part of said connecting means.

5. In a gear-shifting mechanism, the combination with a pair of shiftable members, a pair of members simultaneously movable in opposite directions, a plurality of devices for connecting said movable members to said shiftable members, and resilient means for actuating said devices to an inoperative position, of means for normally retaining all of said devices in an operative position and for selectively releasing a part of said devices.

6. In a gear-shifting mechanism, the combination with a pair of shift rods and a pair of members movable relatively thereto, of means carried by said members for engaging said rods, means for actuating said members simultaneously in opposite directions, and a cam plate slidable transversely of the direction of movement of said members for controlling said engaging means.

7. In a gear-shifting mechanism, the combination with a plurality of shift rods having grooves, and a pair of members movable relatively thereto and having means for projecting into said grooves, of a cam plate for controlling said projecting means, said plate having an intermediate plane surface and grooved end portions.

8. In a gear-shifting mechanism, the combination with a plurality of shiftable gear wheels, and members connected thereto, of means movable simultaneously and rectilinearly in opposite directions for actuating said members, and means for selectively controlling said actuating means, said controlling means comprising a transversely movable cam plate which operates, by its position, to determine the gear to be shifted.

9. In a gear-shifting mechanism, the combination with a plurality of shiftable members, and a pair of members effecting translatory movement relatively thereto and provided with projecting members for engaging said shiftable members, of means for selectively controlling said projecting members, said means comprising a transversely movable cam plate having recessed portions for coacting with said projecting members.

10. In a gear-shifting mechanism, the combination with a plurality of shiftable members, and a pair of members movable relatively thereto in opposite directions and each having members for engaging each of said shiftable members, said pair of members being movable in the same plane, of a member for controlling said engaging members, said controlling member having a plurality of positions in which only one of said engaging members is operative and a position in which all of said engaging members are in operative position.

11. In a gear-shifting mechanism, the combination with a plurality of shiftable members, and a pair of members movable relatively thereto in opposite directions and each having slidable pins for engaging each of said shiftable members, of a member for controlling said pins, said controlling member having a plurality of positions in which only one of said pins is operative and a position in which all of said pins are in operative position.

12. In a gear-shifting mechanism, the combination with a shiftable member and a member rectilinearly movable relative thereto, of a pin for connecting said members, and a plate member for controlling the raising and lowering of said pin.

In testimony whereof, I have hereunto subscribed my name this 24th day of June, 1914.

JESSE R. LANGLEY.

Witnesses:
B. B. HINES,
M. O. MINZ.